2,833,114
Patented May 6, 1958

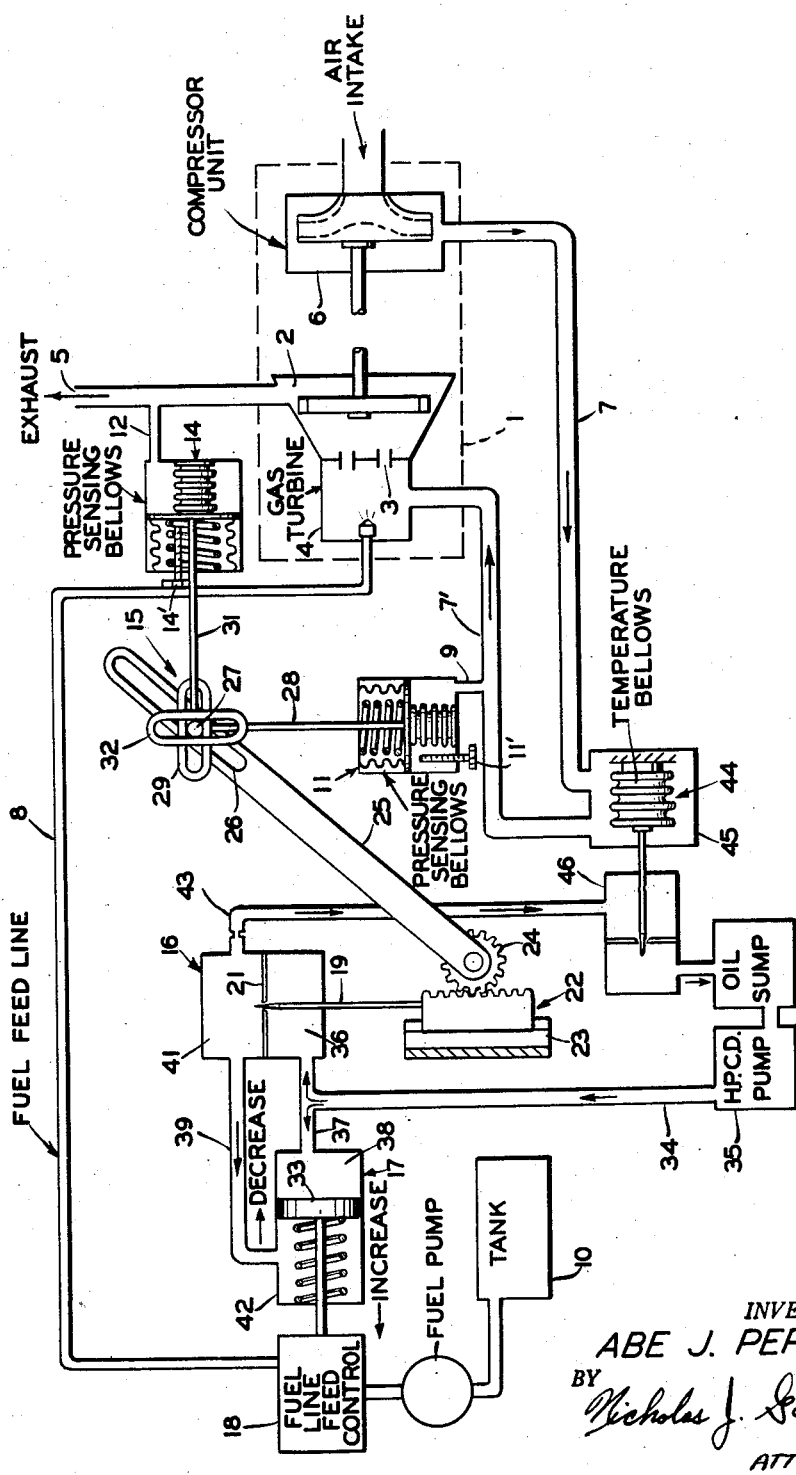

2,833,114

PRESSURE RESPONSIVE CONTROL SYSTEM INCLUDING TEMPERATURE COMPENSATING FEATURE

Abe J. Perle, Verona, N. J., assignor to Bendix Aviation Corporation, Teterboro, N. J., a corporation of Delaware Application May 21, 1954, Serial No. 431,421

3 Claims. (Cl. 60—39.28)

This invention relates to a system responsive to fluid pressure controls including a temperature compensating features for regulating the operation of a prime mover.

The invention though subject to wide application finds particular use in controlling the operations of a combustion turbine, commonly called a turbo-compressor unit of a jet engine.

The compressor unit which supplies air under pressure for combustion to the engine is powered by a turbine that is driven by combustion products from the combustion chamber. The gases pass through nozzles and impinge upon the turbine to rotate it and thereafter the used gases escape to the atmosphere. An increase in speed of the turbine is manifested by increased air pressure from the compressor unit as well as by an increase in the pressure of the exhaust gases escaping from the engine. Increased turbine speed is also manifested by an increase in the heat of compression in the air leaving the compressor unit. On the other hand, decreased turbine speed is evidenced by decreased exhaust and inlet air pressures. It is desired that the output energy of the gas turbine be held to a constant level. This may be maintained by controlling the fuel flow to the engine combustion chamber in such manner that, when the energy level of the turbine increases, the fuel flow will decrease, and conversely when the energy level decreases, the fuel flow increases.

An object of the invention is to hold the energy output of a gas turbine to a constant level.

Another object of the invention is to utilize air pressure and temperature controls in a turbo-compressor unit in an arrangement to maintain the energy output of the turbine at a constant level.

A further object of the invention is to use changes in air inlet pressures and exhaust pressures in a turbo-compressor unit to control the operations of the latter at a constant level of energy output.

A still further object of the invention is to control the operations of a turbo-compressor unit by means of a system responsive to exhaust and inlet pressues of the unit.

Another object of the invention is to provide an inlet and outlet pressure ratio sensing system for air and tubbine burner control.

A more particular object of the invention is to use the pressure of air from a turbo-compressor unit to regulate the operations of the turbine.

The invention further lies in the general arrangement of the various elements thereof as well as in their co-operative association with one another.

The foregoing and other objects and advantages of the invention will appear more fully hereinafter from a consideration of the detailed description which follows, taken together with the accompanying drawing wherein an embodiment of the invention is illustrated. It is to be expressly understood, however, that the drawing is for the purpose of illustration and is not to be construed as defining the limits of the invention.

The drawing is a diagrammatic illustration of a system embodying the invention.

In describing the invention in further detail, reference is now directed to the drawing, wherein there is disclosed a turbo-compressor unit, generally designated 1 of a jet engine. The turbine 2 of which is driven by exhaust gases escaping through nozzles 3 of the combusion chamber 4. The exhaust gases impinge against the turbine wheel, causing it to rotate. The used gases escape through an exhaust port 5 to the atmosphere. The rotating turbine drives an air compressor unit 6 which supplies air under pressure through inlet lines 7 and 7' to the combustion chamber. The combustion chamber is supplied over a line 8 with fuel pumped from a supply tank 10.

Since the energy output of the turbo-compressor unit will be reflected in the pressure of the air inlet supply to the unit and relatively in the exhaust pressure, the ratio of these pressures may be utilized as a control in regulating the operation of the compressor unit and in maintaining a constant level of energy output of the turbine. To this end a tap line 9 extends from the main air input line to a suitable pressure responsive bellows 11. Another tap line 12 extending from exhaust port 5 communicates with a second pressure responsive bellows 14. Both bellows cooperate with suitable mechanism 15 to control the operations of a pilot valve 16. The latter controls the movements of a servo valve 17 which in turn regulates a fuel line control device 18. The latter may be a suitable valve, controlling the fuel supply over the line 8 to the combustion chamber 4.

Pilot valve 16 has a needle element 19 cooperating with a valve seat 21. The needle is connected in suitable manner to a rack bar 22 which is arranged for reciprocal sliding movement in a supported guide piece 23. Elevating the rack moves needle 19 to restrict the valve opening, and lowering the rack has the opposite effect. The rack may be elevated or lowered by a toothed disc 24 fixed at an end of an elongated lever 25. Slidable in an elongated slot 26 at the opposite end of lever 25 is a pin 27 limited by a suitable means, not shown, against endwise movement. A piston rod 28 of bellows 11 engages this pin by means of a slotted crosshead 29; and the piston rod 31 of bellows 14 is similarly associated with pin 27 by a crosshead 32.

The arrangement is intended that elevating pin 27 in slot 26 of lever 25 by either piston rod 28 or 31 will move the rack bar and associated needle element 19 in a direction to open the pilot valve 16, and lowering pin 27 in slot 26 by either rod 28 or 31 will raise the rack and needle element to close the pilot valve.

Opening or closing the pilot valve regulates a flow of high pressure oil to opposite sides of the piston head 33 of the servo valve 17 to move the valve head either to the left or right according to the greater pressure side. Moving the piston head to the left operates the feed control 18 to increase supply of fuel to the combustion chamber 4, and moving it to the right operates to decrease the flow of fuel to the combustion chamber. To this end an oil line 34 leads from a high pressure oil pump 35 to the lower chamber 36 of the double chambered pilot valve 16, and a lateral line 37 extending from line 34 connects with the right side 38 of the piston chamber of the servo valve. An oil line 39 communicates the upper pilot chamber 41 with the left side 42 of the servo piston chamber. A second and oppositely positioned restricted flow oil line 43 drains the upper pilot chamber 41 to an oil sump for further circulation by the pump.

In the operation of the system, pressurized air is fed from the compressor unit 6 over the lines 7 and 7' to the combustion chamber for mixing with fuel fed over the supply line 8. Gases of combustion passing through the nozzles 3 drive the turbine prime mover 2. The latter in turn, among other loads, drives the compressor unit 6. The used gases of combustion escape through the exhaust 5 to the atmosphere. The pressure sensing bellows 14 responds to variations in exhaust pressure communicated over the lateral duct 12. The pressure sensing below 11 responds to variations in pressures of inlet air communicated to it over the lateral duct 9.

The combustion air input bellows 11 is adjusted by conventional associated tension adjustment means so as to respond when pressure of the inlet air rises above a certain maximum, and the exhaust pressure sensing bellows 14 is adjusted to respond when the exhaust pressure falls below a certain minimum. To this end an adjustable stop member 11' is provided which engages the bellows 11 at a pressure below said certain maximum inlet air pressure and an adjustable stop member 14' is provided which engages the bellows 14 at a pressure above said certain maximum exhaust pressure. Obviously, the position of adjustable stop members 11' and 14' may be varied to provide different set points of the bellows 11 and 14 respectively as desired to suit requirements.

Now, should the load of the prime mover 2 be such as to require increased fuel combustion, this will be indicated by a fall in exhaust pressures due to the increase in turbine load. The bellows 14 will thereupon contract to draw the piston rod 31 and crosshead 32 to the right. This action will draw the pin 27 along the lever slot 26 so as to force the lever and the toothed element 24 in a clockwise direction to elevate the rack and restrict the pilot valve opening. Whereupon, the pressure oil flow over line 39 to the left side of the servo valve will decrease and the flow to the right side over line 37 will increase to move the piston rod leftward so as to provide an increase in fuel flow to the combustion chamber. The increased load of the turbine would also be reflected in decreased operation of the compressor unit and decreased inlet air pressure. The pressure sensing bellows 11 would be similarly affected and the fuel flow line similarly controlled. By this means it can be seen that there will be a constant exhaust and inlet air pressure relation to maintain a proper fuel and inlet air supply to the combustion chamber.

Should the opposite conditions arise where the load of the turbine prime mover has decreased, there will be a rise in exhaust and inlet air pressures due to increased speed of the turbine. The rise in inlet air pressure would be indicated by action of the bellows 11 to turn the lever wheel 24 counterclockwise so as to open the pilot valve wider. This action will increase the pressure oil flow to the left side of the servo piston chamber and will cause a movement of the piston head 33 toward its right position so as to decrease the fuel supply to the combustion chamber.

It is also desired that the temperature of the inlet air caused by the heat of compression be held to a desired constant range, and that where this exceeds the desired temperature range, it is desired that a compensating decrease in the fuel supply take place. To this end there is associated with the inlet air feed a temperature responsive bellows 44, which may be of any preferred type, the one shown being intended merely as illustrative. The temperature responsive bellows is shown here supported in a well 45 intermediate of the inlet air lines 7 and 7'. And there is provided in the pilot valve drain line 43 a needle valve 46, the needle of which is moved to and from its seat by the expansion and contraction of the temperature bellows. The needle valve is normally held open, and the temperature bellows are adjusted in the conventional manner of such bellows to respond upon the temperature rising above a certain maximum.

Now, should the temperature of the inlet air over line 7 rise above this set maximum due to the heat of compression of the compressor unit, the bellows 44 will respond to restrict or close the valve 46 and block the oil flow to drain. A back pressure will thereupon be created in the upper pilot chamber 41 and the piston 33 will be forced in a direction to provide a decrease in fuel flow.

It is to be appreciated that upon increased speed of the turbine causing the increased heat of compression and rise in the temperature of the inlet air, counterclockwise movement of the lever arm 25 takes place to effect a wider opening of the pilot valve 16 and a consequent decrease in the fuel supply to the combustion chamber. Any further decrease in fuel supply through the action of the temperature bellows is here a compensating factor attendant upon the increased heat of compression of the inlet air.

Although, but one embodiment of the invention has been illustrated and described above, it is to be expressly understood that the invention is not limited thereto. Various changes can be made in the design and arrangement of the parts without departing from the spirit and scope of the invention, as the same will now be understood by those skilled in the art.

What is claimed is:

1. In a pressure fluid operated control system for regulating a flow of fuel to the combustion chamber of a hot gas turbine engine having a turbo-compressor unit, an inlet air supply line from the compressor unit to the combustion chamber and an exhaust line from the turbine; a pressure responsive device responsive to pressure variations above a certain maximum in the inlet air supply line, a pressure responsive device responsive to pressure variations below a certain minimum in the exhaust line, a control needle valve, mechanism for opening the control valve wider in response to actions of the first device in responding to variations of the inlet air pressure above the maximum, and for restricting the opening of the control valve in response to actions of the second device in responding to variations in pressure in the exhaust line below the minimum, a fuel line independent of the inlet air supply line and connected to the combustion chamber, a servo valve controlling increases and decreases of fuel flow through the fuel line to the combustion chamber, and means responsive to restrictions in the opening of the control valve to actuate the servo valve to increase the flow of fuel to the combustion chamber and responsive to wider opening of the control valve to actuate the servo valve to decrease the flow of fuel to the combustion chamber, said mechanism having a first connection with said pressure responsive device and a second connection with said second pressure responsive device, said first and second connections being movable simultaneously but independently of each other such that movement of one of said devices does not affect the other.

2. Means as in claim 1, wherein a temperature responsive control device is provided responsive to increases in temperature of the inlet air supply above a certain maximum, and the means is further responsive to the temperature responsive control device to actuate the servo valve to effect a temperature compensating decrease in fuel flow to the combustion chamber.

3. Means controlling a constant flow of fuel to the the combustion chamber of a hot gas turbine engine including a compressor unit driven by the turbine engine and including an air supply line from the compressor unit to the combustion chamber and an exhaust line from the turbine; a fluid pressure responsive device responsive to pressure variations above a certain maximum in the air supply line, a fluid pressure responsive device responsive to pressure variations below a certain minimum in the exhaust line, a temperature responsive device responsive to increases in temperature of the air supply above a certain maximum, a control needle valve, tooth and rack mechanism associated with the needle valve responsive to actions of the first device to open the needle valve wider and responsive to actions of the second device to restrict the control valve, a fuel line independent of the air supply line and connected from a source of fuel to the combustion chamber, a servo valve controlling increases and decreases of fuel flow through the fuel line to the combustion chamber, means for generating a control fluid pressure, said control fluid pressure being variable in response to restrictions in the opening of the control valve to actuate the servo valve to increase the flow of fuel to the combustion chamber and being responsive to wider openings of the control valve to actuate the servo valve to decrease the flow of fuel to the combustion chamber, and the control fluid pressure being variable in response to actions of the temperature responsive device to further actuate the servo valve to effect a temperature compensating decrease in fuel flow to the combustion chamber.

References Cited in the file of this patent

UNITED STATES PATENTS

| | | |
|---|---|---|
| 2,384,282 | Chandler | Sept. 4, 1945 |
| 2,416,797 | Dodson | Mar. 4, 1947 |
| 2,435,902 | Reggio | Feb. 10, 1948 |
| 2,438,662 | Greenland | Mar. 30, 1948 |
| 2,601,777 | Woodward | July 1, 1952 |
| 2,622,393 | Edwards et al. | Dec. 23, 1952 |
| 2,652,813 | Reuter | Sept. 22, 1953 |